United States Patent Office.

J. H. TAYLOR, OF NEW YORK, N. Y.

*Letters Patent No. 70,761, dated November 12, 1867.*

IMPROVED PROCESS OF PREVENTING DECAY IN WOOD.

*The Schedule referred to in these Letters Patent and making part of the same.*

TO ALL WHOM IT MAY CONCERN:

Be it known that I, J. H. TAYLOR, of the city of New York, in the county of New York, and State of New York, have invented a new and useful Process for Preventing the Decay of Wood and other fibrous materials; and I do hereby declare that the following is a full, clear, and exact description thereof, which will enable those skilled in the art to make and use the same.

It is well known that the durability of wood, in its natural condition, depends upon the amount of tannin and resinous matter it contains, and that the presence of nitrogenous matters, acting as a ferment, causes its decay. To prevent this fermentation in the wood, and thus prevent decay, is the object of my invention. To effect this, I make use of a combination of chemical agents, which are known to coagulate albuminous and nitrogenous matter, and at the same time form solid compounds with the resinous portion of the woody fibre.

From time to time many ways have been devised to produce this result, but none of them seem to have been designed with a true reference to chemical principles involved in the process. Hence the failure that must result from these processes from the want of a proper understanding of the chemical nature of the substances employed. As, for example, when coal tar, wood tar, rosin, and asphalt are subjected to the action of heat, it is well known that different substances pass over in the distillation in proportion to the amount of heat used, and unless the temperature is very high, all that passes over in the form of vapor is very light and volatile, while the real antiseptic or preservative agents, creosote, naphthalim, &c., do not form in the vapor of distillation until the very last, when the temperature has been raised to 400°, and upwards, Fahrenheit. Again, suppose this degree of heat to be applied in order to eliminate these substances from a given quantity of wood tar, coal tar, rosin, and asphalt, the amount evolved would be inappreciable in proportion to the amount of material designed to be saturated, while the first products of the distillation of the above-named substances converted into vapor would be so light and volatile as would render them of little value after they had even penetrated dense woody fibre. Thus it is that only after the first products of distillation have passed over and much greater heat applied, compounds are generated by the distillation of sufficient density to permeate wood, and in such inappreciable quantities as to be inoperative for the purpose intended.

The application of fit substances in the form of steam or vapor to the fibres of wood and other material is, no doubt, the proper method of saturating the substance designed to be preserved; but in making this application, we should consider the chemical nature of the compounds we use, and their behavior under certain conditions.

I will now proceed to give the materials I use, and the affinity they have in relation to the compounds into which they are intended to enter, and their proportion in one hundred parts: five parts creosote, fifteen parts acetic acid, twenty-five parts wood vinegar or pyroligneous acid, twenty parts (by measure) lamp-black, thirty-five parts crude kerosene, in combination as here described; decoction of oak bark, in quantity sufficient for the purpose described.

I have before stated that the most important antiseptic or preservative, creosote, is not obtained in the distillation of coal tar, wood tar, rosin, asphalt, &c., in sufficient amount for the purpose intended in a given quantity of those substances likely to be used in the process of preserving wood and other fibrous substances. I therefore use the substance creosote itself as prepared for commerce, dissolve it in the acetic and pyroligneous acid, in which condition it is easily converted into vapor and made to permeate the pores and fibres of the wood, where it readily coagulates the albuminous compounds contained therein. The property of creosote to coagulate albumen is well known. One per cent. will prevent the decay of flesh. The acetic acid, in which I dissolve the creosote, is of itself a powerful antiseptic, probably the next in rank to creosote. So also the wood vinegar or pyroligneous acid, both containing creosote in solution in their natural condition. Wood vinegar also holds materials that have been extracted from the wood, some varieties furnishing more in the manufacture than others. Lamp-black, the next substance in order, is composed of carbon and resinous matters, and its ash contains about nine per cent. of iron and silica, the whole constituting materials very essential to the preservation of fibre. It is a well known property of carbon to preserve wood, as instance the charring of timber, which process tends to preserve it, Crude kerosene, when reduced to steam or vapor, is highly antiseptic in its compounds generated by heat, besides imbuing the wood with oleaginous particles.

First. The creosote dissolved in the acetic acid and wood vinegar, the lamp-black mixed with the crude kerosene, are all placed in one retort or condenser ready for use.

Second. The decoction of oak bark, in sufficient quantity for the purpose, I place in another retort or condenser, and carry the steam or vapor by pipes to the chamber containing the wood to be operated upon. The heat thus generated and carried to the wood-chamber expels the moisture from the wood, expands the pores, and causes the following chemical operation to take place: The tannin and other analogous agents derived from the bark unite with the nitrogenous and gelatinous elements in the cellular tissue of the wood, coagulate them, and form solid compounds with the resinous portion of the wood.

Now, tannin is supplied to the tree during its growth, and enters largely into the composition of the bark, and is constantly performing this function of coagulation upon the albumen of the tree, and it is reasonable to infer that when we impart this agent artificially to the tissue of the wood, an analogous condition is the result, like that exhibited during the life of the tree. Any substance containing tannin may be used for this purpose.

This first part of the process having been carried on a sufficient length of time, heat is applied to the retort containing the compounds before described in their relative proportions, and the steam or vapor carried in the same way to the chamber containing the wood, the wood becoming thoroughly saturated with the vapors from these compounds, the creosote and other compounds coagulating all the material of a gelatinous and nitrogenous nature the tannin has passed over or omitted during its introduction, and the wood, as a result, becomes indurated to the best degree by means of the agents used and herein described.

When the fibrous materials to be treated are of lighter texture than wood, as cloth, sails of vessels, ropes, canvas, &c., &c., the first process of introducing the elements of tannin, &c., may be omitted, and the vapors from the retort containing the other agents introduced in the usual way to the chambers containing the material to be operated upon in the manner before described.

I do not claim the use of any particular kind of retort in which to generate these vapors, nor do I claim any peculiar constructed chamber for wood and other materials, as these may be made to suit the purpose of the operators, but what I claim, and desire to secure by Letters Patent, is as follows:

1. The chemical combinations of the above-named agents, in the manner described, for the purpose of preserving wood and other fibrous materials from decay.

2. The combination of these potent antiseptics in the form of vapor, acting in accordance with known chemical laws, in the manner and for the purpose described.

J. H. TAYLOR.

Witnesses:
RUSSEL T. COE,
O. W. V. STERNE.